(12) United States Patent
Ng et al.

(10) Patent No.: US 11,092,545 B2
(45) Date of Patent: Aug. 17, 2021

(54) LASER DIODE TURRET RADIATION SOURCE FOR OPTICAL SPECTROMETRY

(71) Applicant: The United States of America, as represented by the Secretary of the Navy, Crane, IN (US)

(72) Inventors: Kin Chiu Ng, Fresno, CA (US); Subrata Sanyal, Eastvale, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/931,621

(22) Filed: Jul. 17, 2020

(65) Prior Publication Data
US 2021/0018434 A1 Jan. 21, 2021

Related U.S. Application Data

(60) Provisional application No. 62/875,825, filed on Jul. 18, 2019.

(51) Int. Cl.
| G01N 21/00 | (2006.01) |
| G01N 21/39 | (2006.01) |
| G01J 3/28 | (2006.01) |
| G01J 3/42 | (2006.01) |

(52) U.S. Cl.
CPC ............... *G01N 21/39* (2013.01); *G01J 3/28* (2013.01); *G01J 2003/423* (2013.01); *G01N 2021/399* (2013.01)

(58) Field of Classification Search
CPC ............ G01N 21/1702; G01N 21/171; G01N 21/1717; G01N 21/255; G01N 29/2418

USPC .......................................................... 356/432
See application file for complete search history.

(56) References Cited

U.S. PATENT DOCUMENTS

| 2007/0058038 A1* | 3/2007 | David | G01S 17/18 348/135 |
| 2008/0029711 A1* | 2/2008 | Viellerobe | G01N 21/6428 250/459.1 |
| 2011/0032605 A1* | 2/2011 | Kuner | H01S 3/11 359/344 |
| 2012/0292531 A1* | 11/2012 | Grudinin | G01N 21/65 250/459.1 |

(Continued)

*Primary Examiner* — Md M Rahman
(74) *Attorney, Agent, or Firm* — Naval Surface Warfare Center, Crane Division; Eric VanWiltenburg

(57) ABSTRACT

The present invention relates to the design, construction, and operation for a diode-turret. Exemplary embodiments comprise several tens of laser diodes to function as a multiple-line radiation source. The invention further describes the construction for a socket-turret; this socket-turret will flexibly fit any numbers (limited only by the number of sockets available) of laser diodes. The invention further describes two radiation coupling-optics for the output from the turret of laser-diodes, one with an integrating sphere and another with a collimating scope. One operation method allows its user to set for any number of diode, functioning one diode at a time, sequentially, hopping from one diode to another, as a single-line radiation source for the spectrometry. Another operation method permits its user to set a group with any number of diodes, functioning several diodes simultaneously at a time, as a multiple-line radiation source for spectrometry.

5 Claims, 6 Drawing Sheets

(56) References Cited

U.S. PATENT DOCUMENTS

| | | | |
|---|---|---|---|
| 2014/0239998 A1* | 8/2014 | Long | G01R 31/26 324/757.01 |
| 2015/0075264 A1* | 3/2015 | Asif | G01Q 70/02 73/78 |
| 2015/0316411 A1* | 11/2015 | McCord | G01J 3/0251 356/402 |
| 2015/0346479 A1* | 12/2015 | Hirokubo | G02B 26/001 359/578 |
| 2019/0255668 A1* | 8/2019 | Williamson | B23Q 7/10 |
| 2019/0302083 A1* | 10/2019 | Lalovic | G01J 3/04 |
| 2020/0276673 A1* | 9/2020 | Sturmer | B22F 10/00 |

* cited by examiner

LASER DIODE TURRET RADIATION SOURCE FOR OPTICAL SPECTROMETRY

CROSS REFERENCE TO RELATED APPLICATIONS

This patent application claims priority to U.S. Provisional Application No. 62/875,825, titled "Laser Diode Turret Radiation Source for Optical Spectrometry," filed on Jul. 18, 2019, the disclosure of which is expressly incorporated herein by reference.

STATEMENT REGARDING FEDERALLY SPONSORED RESEARCH OF DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,603) is assigned to the United States Government and is available for licensing for commercial purposes. Licensing and technical inquiries may be delivered to the Technology Transfer Office, Naval Surface Warfare Center Corona Division, email: CRNA_CTO@navy.mil.

FIELD OF THE INVENTION

The present invention relates to single-line and multiple-line radiation source spectrometry.

BACKGROUND AND SUMMARY OF THE INVENTION

The present invention relates to a diode-turret for conducting spectrometry. Optical spectrometry is a major technique for chemical identification and quantification. Most optical spectroscopic techniques require use of a source radiation to irradiate a sample, followed by detection and measurement of characteristic light transmitted, reflected, refracted, scattered, absorbed, or emitted from a substance of interest. The spectral region used for irradiation and detection titles a technique such as UV-Vis (ultra violet—visible) Absorption Spectrometry, Infra-Red Absorption Spectrometry, Fluorescence Spectrometry, Raman Scattering Spectrometry, and, Resonance Raman Scattering Spectrometry.

The source radiation provides a spectral signature for the substance of interest. Radiation sources may be divided into white sources (broad-band) and line (or narrow-band) sources. White radiation sources such as xenon lamp, deuterium lamp, and tungsten lamp, are available. Line (or narrow-band) sources such as hollow cathode lamp, laser, and laser diode [light emitting diode (LED)] are available. Spectrometers employing a white source require optical components to isolate a particular spectral line for use. Spectrometers employing a line source already provide a spectral line for use. Most spectrometric operations employ single color (wavelength) radiation. Spectrometers equipped with a white light source or laser/laser diodes are commercially available, or, are used in research laboratories. Spectrometers with a white light source is bulky because of the generation-assembly and the optical components needed for the light separation. Spectrometers with a LED light source are very compact and portable.

The performance of a spectrometry may be affected by the radiation wavelength used. For example, irradiating a chemical with a visible wavelength versus irradiating the same chemical with a near-IR wavelength or a visible wavelength versus a deep UV wavelength. Another example is that the deep UV spectral region is excellent for biomolecules detection and the IR region is ideal for pollutant-chemicals detection. It is, therefore, beneficial to have a flexible radiation source that provides a large selection of colors or wavelengths so an operator can use particular wavelengths, on demand. For compact spectrometers and portable devices, this radiation source must be small in dimension and light in weight. This invention aims for both of the aforementioned superior features, designing for a flexible, compact multi-LED radiation source.

According to an illustrative embodiment of the present disclosure, The invention here describes the design, construction, and operation for a diode-turret. The turret contains several tens of laser diodes to function as a multiple-line radiation source. The invention further describes the construction for a socket-turret; this socket-turret will flexibly fit any numbers (limited only by the number of sockets available) of laser diodes. The invention further describes two radiation coupling-optics for the output from the turret of laser-diodes, one with an integrating sphere and another with a collimating scope. One operation method allows its user to set for any number of diode, functioning one diode at a time, sequentially, hopping from one diode to another, as a single-line radiation source for the spectrometry. Another operation method permits its user to set a group with any number of diodes, functioning several diodes simultaneously at a time, as a multiple-line radiation source for spectrometry; this method also allows sequential-hopping operation from one group of diodes to another group of diodes.

According to a further illustrative embodiment of the present disclosure, a multiple-line radiation source will allow spectrometric operation, optimized for selectivity and sensitivity; it will also allow for fast detection and measurement because of the multiple chemical capability. Its operation will generate a large set of data, and therefore, the statistical Chemo-metric method can be applied which will provide a very high level of confidence for identification for substances of interest and will provide a unique data-profile for the sample.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
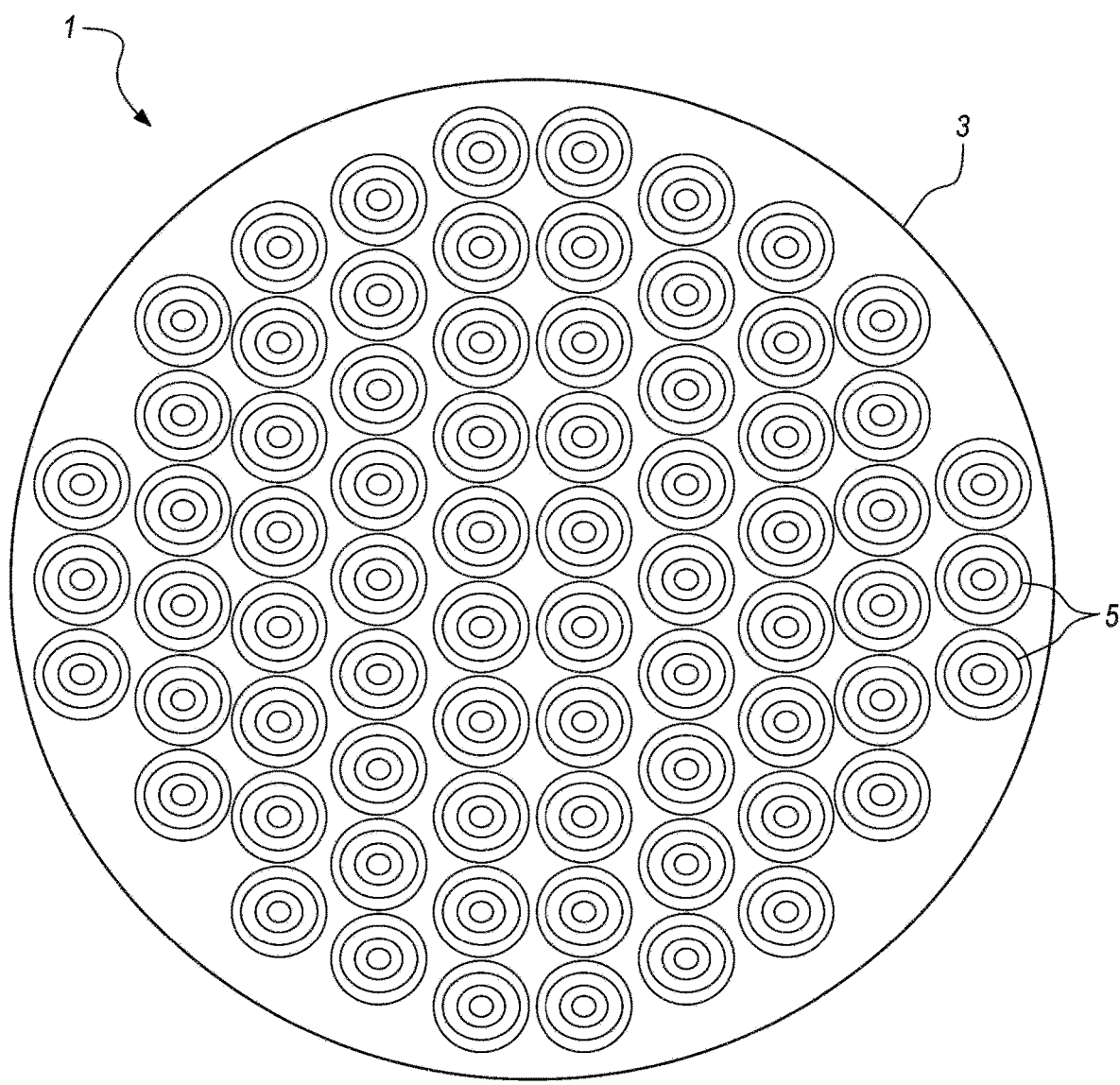
FIGS. 1-3 show exemplary diode-turret layouts.

FIG. 1 shows an exemplary layout of a diode-turret 1. The turret 1 is fitted with several tens modules of laser diodes 5. Each module of laser diode (LD) 5 is wired to the central diode driver and has its own lens of suitable lens-material for collimating its radiation output. The head of the LD module is ~5 millimeter diameter. Each LD emits a particular wavelength of light, illustratively, but not limited to, 240 nm in the deep UV region. Commercial single-wavelength laser diodes are available ranging from deep UV of ~200 nm to mid-IR of ~7000 nm, with 5-10 nm of increment. Each LD generates a radiant power of several micro-watt to several watt levels. Development in LD will expand the range of spectral regions and power levels in the future, and will reduce the dimension of the LD module. The several tens of LDs 5 are arranged in patterns of circle, square, rectangle, or triangle. In this embodiment, a 72-diode-array is used. The diodes in the turret are of different wavelengths, of same repeated wavelengths, of same or similar power output, or of different power output. The position to place a LD is flexible. The flexible choice for wavelength, power, and position, will allow an operator to optimize for the spectrometric detection and measurement.

The turret is constructed with metal, such as (but not limited to), aluminum; the surface 3 is blackened with non-reflective paint for preventing light to scatter. Laser diodes are very compact in size and well developed; they are the preferred radiation sources for use in portable devices and spectrometers. Each laser diode provides a particular radiation line-wavelength such as 240 nm (nanometer); 350 nm; 440 nm; 525 nm; 630 nm; . . . or 4500 nm. Commercial laser diodes emitting light with wavelength increments of 5 to 10 nm are currently available spanning from the deep ultra-violet (UV) of ~200 nm to the mid-infra-red (IR) of 7000 nm. The deep UV spectral region is excellent for biomolecules detection and the IR region is ideal for pollutant-chemicals detection. Laser-diode based spectrometers presently are equipped with one or a few diodes.

Figure 2:
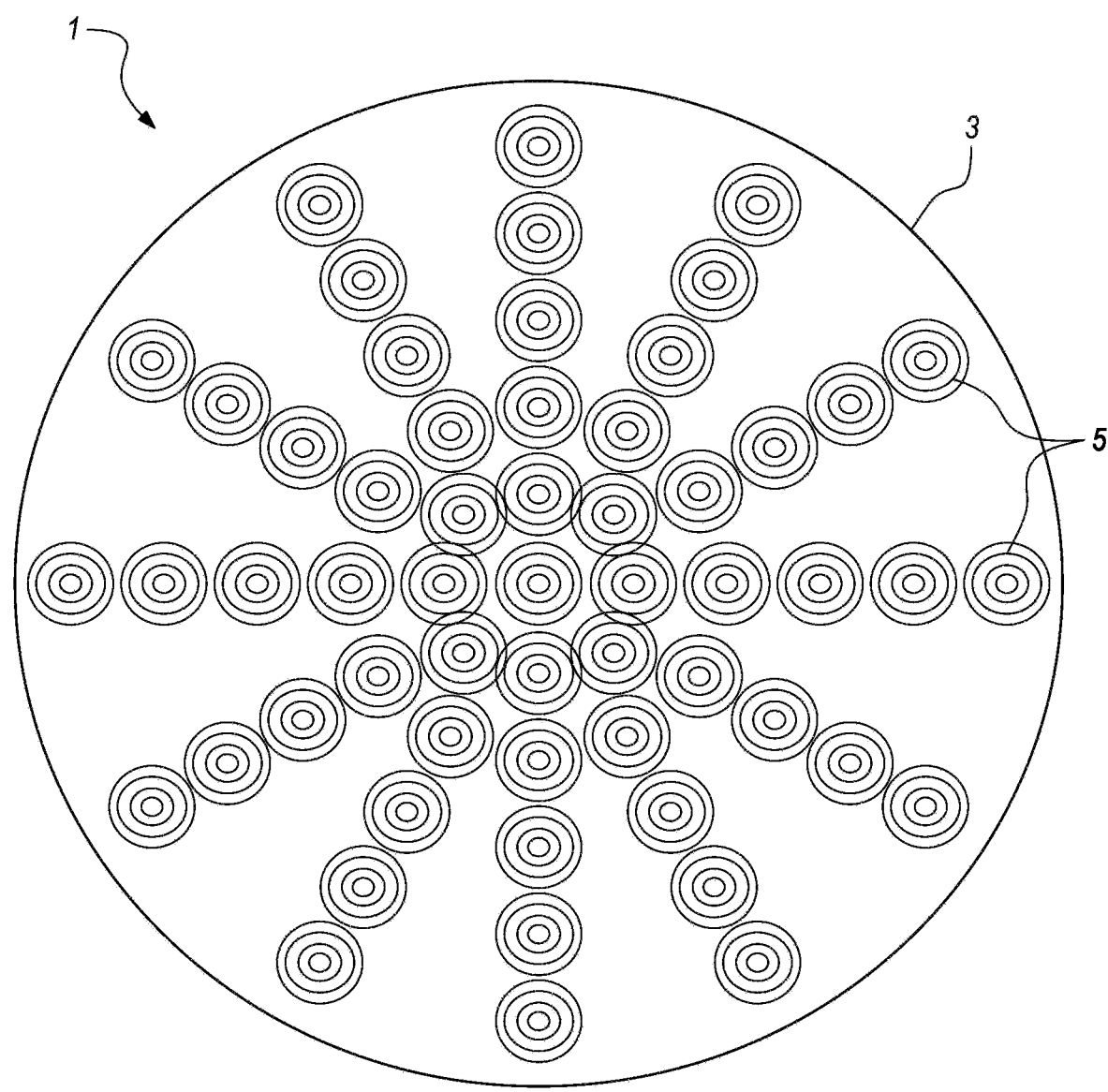

FIG. 2 shows an exemplary layout of a diode-turret. In this example, the turret has fifty-seven laser diodes arranged as a radial-array. The diodes are arranged radially in this example, but they can be arranged in other patterns such as square, rectangle, or, triangle.

Figure 3:
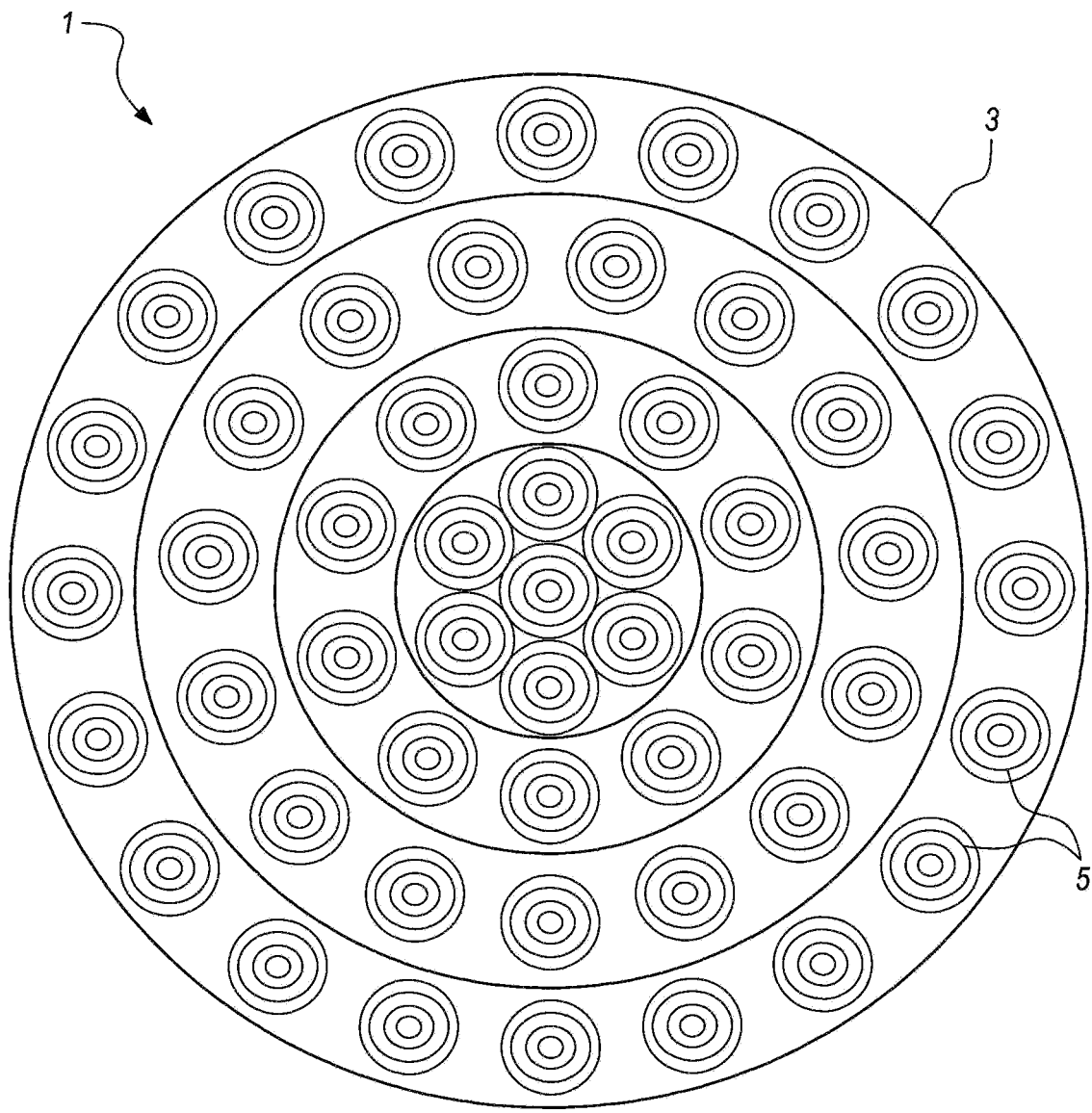

FIG. 3 shows an exemplary layout of a diode-turret with several tens of socket, allowing the fitting for a selective set of laser diodes. Each socket fits and drives one module of laser diode. The socket-turret flexibly fit any numbers of laser diodes (up to the number-limit of sockets) of the same wavelength or of different wavelengths.

Figure 4:
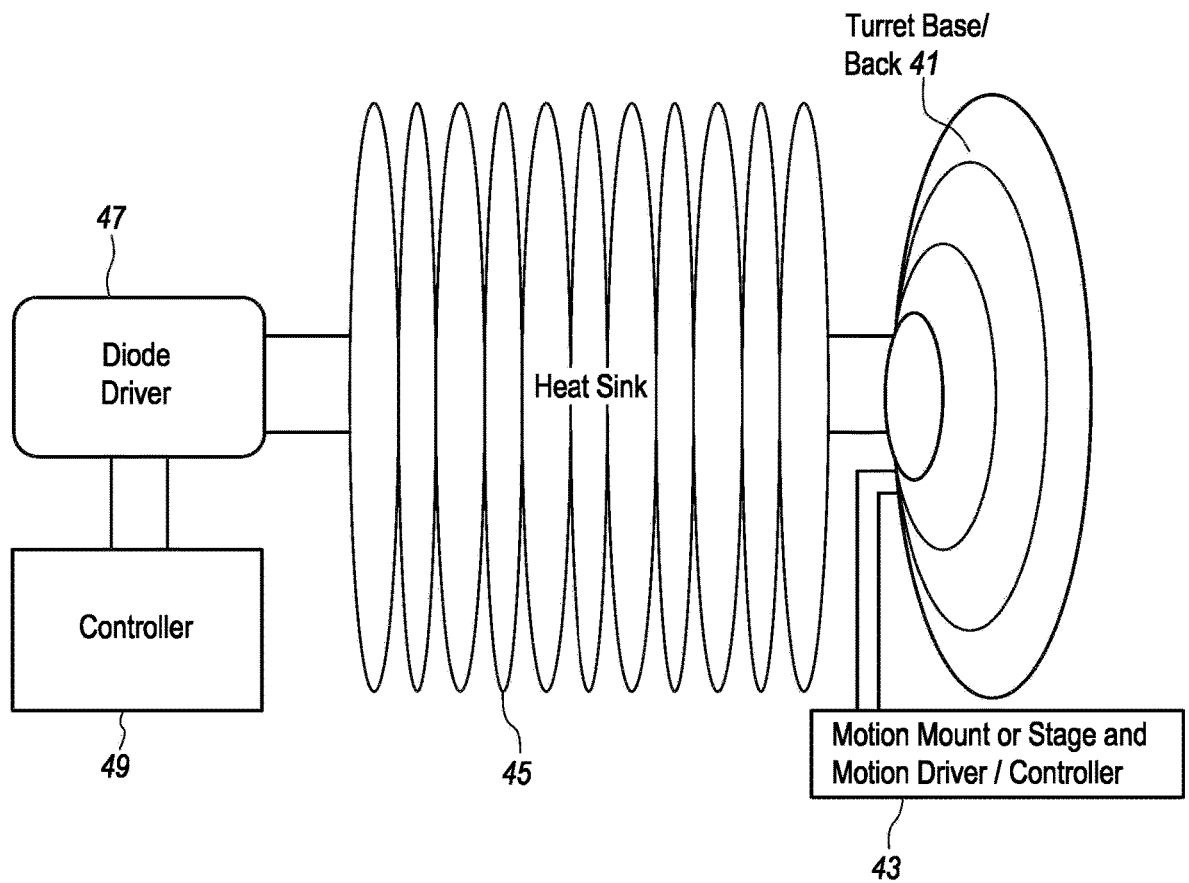
FIG. 4 shows an exemplary turret base.

FIG. 4 shows an exemplary turret base 41. The heat sink 45 dissipates heat from the turret and diode-driver 47. The motion mount 43, with the programmable motion driver/controller, can move (for example, shift and rotate) the turret precisely to a desired diode position.

Figure 5:
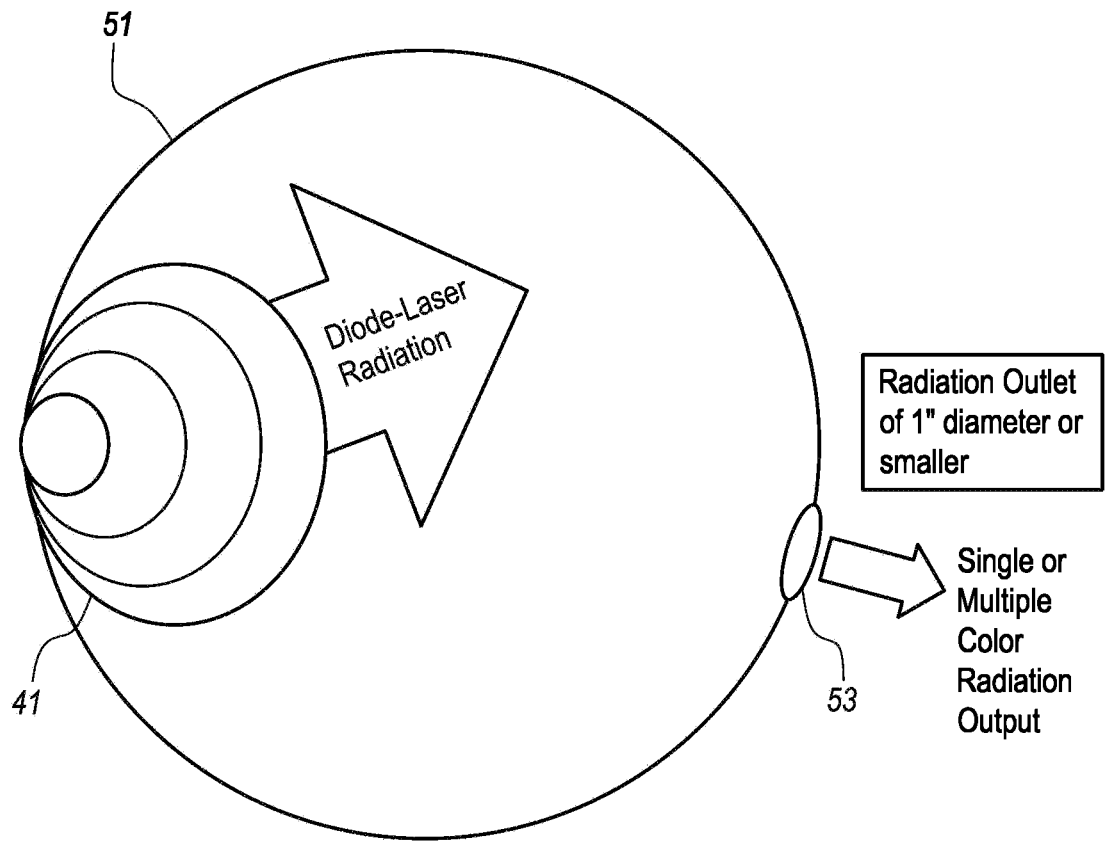
FIG. 5 shows an exemplary embodiment coupled to an optical sphere.

FIG. 5 shows an exemplary turret base 41 coupled to an optical sphere 51. The diode-turret of several-inch diameter (for example, 2.5") is fitted light-tight to an opening of an optical sphere. The optical sphere can have a several inch diameter (for example 5.5"), with a coating reflective to all the color wavelengths of the diode laser radiation. Optical sphere 51 can have an outlet opening 53 (e.g., 1" diameter or smaller). External to the outlet opening is a fitting connector for optical fiber, fiber bundle, or collimating optics. The output radiation can be collected and directed via the fiber optics, fiber bundles, or collimating optics, for irradiation at a sample-target.

An exemplary method with this setup involves the operator to pre-set a group of diodes and use the group-radiation as a simultaneous multiple-line source for spectrometry. The operator can flexibly select desirable diodes and the number of diodes, with the programmable controller, to form a group. The operator can turn on one pre-set group of diodes at a time; the pre-set groups can be turned on sequentially or via hopping.

Figure 6:
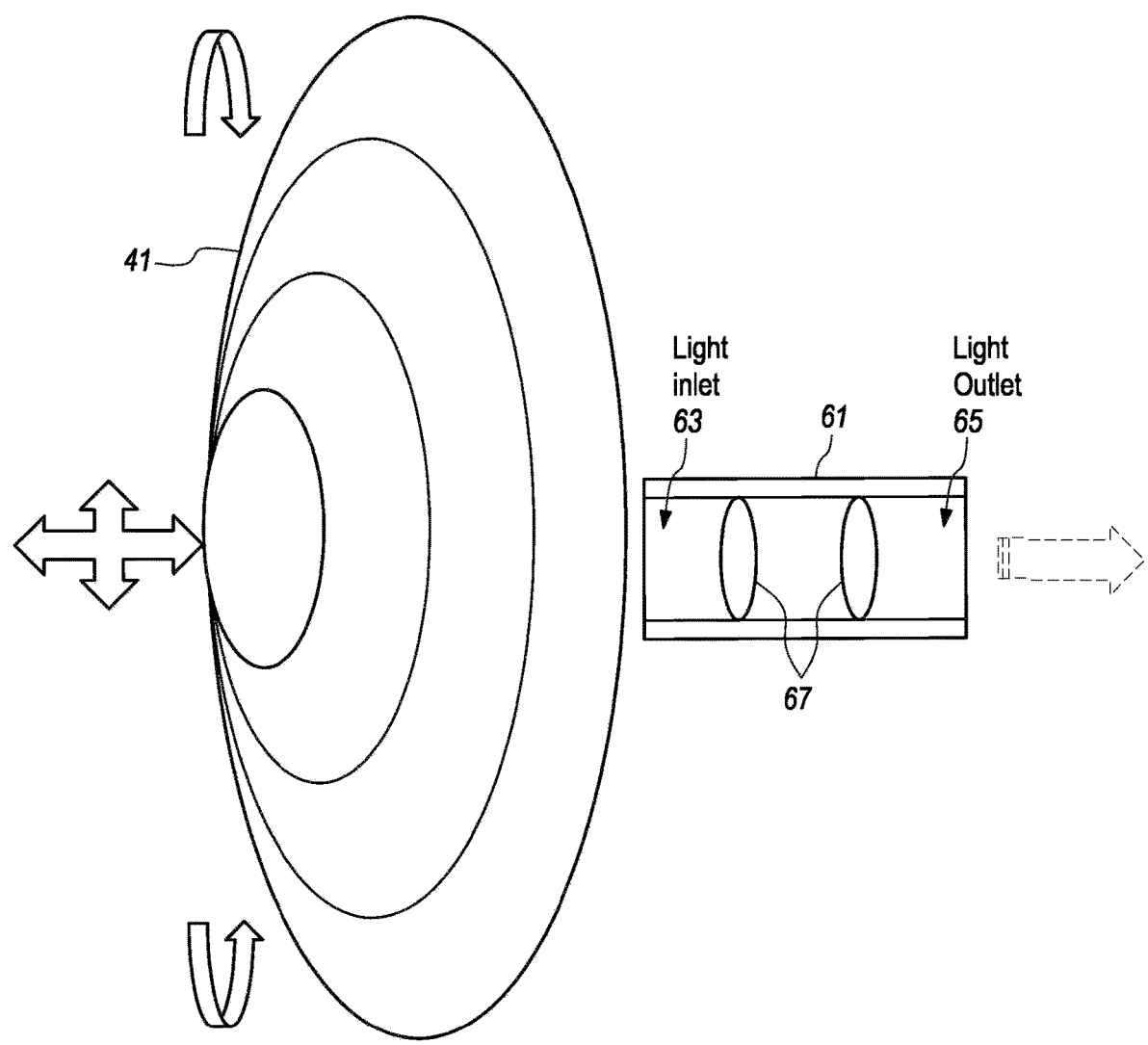
FIG. 6 shows an exemplary embodiment coupled to a collimating scope.

FIG. 6 shows an exemplary turret base 41 coupled to a collimating scope 61. The diode-turret, mounted to a motion stage (as shown in FIG. 4), moves/rotates/shifts via programmable motion controller, and positions one selected diode at the focal point of the collimating lens 67. Collimating scope can be in fixed position pointing at the "initial" center-position of the turret and focuses on the diode to collect and collimate the radiation. The lens material can be selected to transmit all the wavelengths of interest. This coupling scope will retain phase property of the diode radiation. This optical polarization property is advantageous for some spectrometry. At the outlet of the collimating scope is a fitting connector for optical fiber, fiber bundle, or collimating optics. The output radiation can be collected and directed via the fiber optics, fiber bundles, or collimating optics, for irradiation at a sample-target.

An exemplary method with this setup involves the operator to set for any number of desired diodes, leading the turret positions one selected diode at a time, at the focal/center point of the collimating scope; sequentially, hopping from one diode to another, within the pre-set group of diodes. This positioning diode-turret functions as a sequential single-line radiation source for spectrometry.

In spectrometry, one or more signals ("peaks") may be detected from a substance of interest, corresponding to the specific diode-radiation used to irradiate the sample. By using the turret of diodes and its operating procedure, a high number of spectral-signals will be generated and collected. The operator can set a particular group of laser-diodes and diode-generated-signals, representing the signature identification for the substance (e.g., chemical) of interest and/or the fingerprint profile for the sample (e.g., Los Angeles air). A sample profile may include "peaks" from both identifiable and non-identifiable chemicals and peak-shapes from selective spectral regions. The turret-diode radiation source described herein can implement this procedure effectively with the statistical analysis method of Chemo-metric. This method can generate results with a very high level of confidence.

Although the invention has been described in detail with reference to certain preferred embodiments, variations and modifications exist within the spirit and scope of the invention as described and defined in the following claims.

The invention claimed is:
1. A laser diode turret system comprising:
   a turret body formed with turret base and a plurality of sockets;
   a plurality of laser diodes coupled to the plurality of sockets;
   a diode driver configured to selectively activate the plurality of laser diodes;
   a heat sink disposed between the turret body and the diode driver;
   a controller electrically coupled to the diode driver;
   a motion mount coupled to the turret body, wherein the motion mount is adapted to allow the turret body to shift or rotate; and
   a motion controller electrically coupled to the motion mount, wherein the motion controller is configured to control movement of the motion mount.

2. The system of claim 1, further comprising an optical sphere coupled to the turret body.

3. The system of claim 1, further comprising an optical sphere coupled to the turret body.

4. The system of claim 1, further comprising a collimating scope coupled to the turret body.

5. The system of claim 1, further comprising a collimating scope coupled to the turret body.

\* \* \* \* \*